United States Patent
Wang et al.

(10) Patent No.: US 12,005,517 B2
(45) Date of Patent: Jun. 11, 2024

(54) COMBINED PROCESSING HEAD CAPABLE OF EMITTING LASER AND LIQUID JET TO PRODUCE ABRASIVE FLOW AND WORKING METHOD THEREOF

(71) Applicant: Shufeng Sun, Zhejiang (CN)

(72) Inventors: Pingping Wang, Qingdao (CN); Qiangqiang Lv, Qingdao (CN); Shufeng Sun, Wenzhou (CN); Mengfan Sun, Qingdao (CN); Meng Sun, Qingdao (CN)

(73) Assignee: Shufeng Sun, Zhejiang (CN)

( * ) Notice: Subject to any disclaimer, the term of this patent is extended or adjusted under 35 U.S.C. 154(b) by 401 days.

(21) Appl. No.: 17/166,486

(22) PCT Filed: Nov. 22, 2019

(86) PCT No.: PCT/CN2019/120388
§ 371 (c)(1),
(2) Date: Feb. 3, 2021

(87) PCT Pub. No.: WO2020/215715
PCT Pub. Date: Oct. 29, 2020

(65) Prior Publication Data
US 2021/0394301 A1   Dec. 23, 2021

(30) Foreign Application Priority Data

Apr. 25, 2019   (CN) .......................... 201910340702.7

(51) Int. Cl.
*B23K 26/00*   (2014.01)
*B23K 26/06*   (2014.01)
(Continued)

(52) U.S. Cl.
CPC ...... *B23K 26/0093* (2013.01); *B23K 26/0648* (2013.01); *B23K 26/142* (2015.10); *B23K 26/146* (2015.10)

(58) Field of Classification Search
CPC .............. B23K 26/0093; B23K 26/142; B23K 26/146; B23K 26/0648; B23K 26/00; B23P 23/00; B24C 3/00
See application file for complete search history.

(56) References Cited

U.S. PATENT DOCUMENTS 5,059,256 A   10/1991   Kanapenas et al.
5,575,705 A * 11/1996   Yam ........................ B24C 9/006
                                                              451/39
(Continued)

FOREIGN PATENT DOCUMENTS

CN   104290041 A     1/2015
CN   207447603 U *   6/2018
(Continued)

OTHER PUBLICATIONS

Feb. 7, 2020 Search Report issued in International Patent Application No. PCT/CN2019/120388.
(Continued)

*Primary Examiner* — Janie M Loeppke
*Assistant Examiner* — Theodore J Evangelista
(74) *Attorney, Agent, or Firm* — JCIPRNET

(57) ABSTRACT

A combined processing head includes: a jetting mechanism including a connection portion having a passage in communication with a nozzle and lens cylinder inner space, one connection portion end is connected to the lens cylinder and the other end to the nozzle extending therein and having a flange in close contact with a nozzle side wall forming an annular cavity with the side wall, the flange having through holes in communication with the annular cavity and a nozzle (Continued)

inner space, the nozzle side wall position at which the annular cavity is located has a liquid injection port to inject a saturated salt solution at a set pressure into the annular cavity; and a cooling mechanism including a cooling cylinder having openings at two ends, the cooling cylinder inside having a cooling tube to cool the ejected and flowing saturated salt solution to enable fine crystalline grains to be precipitated.

12 Claims, 5 Drawing Sheets

(51) Int. Cl.
*B23K 26/142* (2014.01)
*B23K 26/146* (2014.01)

(56) References Cited

U.S. PATENT DOCUMENTS

2007/0158320 A1* 7/2007 Kuo ................. B23K 26/146
219/121.84
2017/0320166 A1* 11/2017 Zhang ................. B23K 26/1464
2021/0213566 A1* 7/2021 Flores ................. B23K 26/705

FOREIGN PATENT DOCUMENTS

| CN | 108296633 A | | 7/2018 | |
|---|---|---|---|---|
| CN | 109048054 A | | 12/2018 | |
| CN | 110153708 A | | 8/2019 | |
| JP | H11-123583 A | | 5/1999 | |
| JP | H11123583 A | * | 5/1999 | |
| JP | 2007-185694 A | | 7/2007 | |
| JP | 2008178895 A | * | 8/2008 | |
| WO | WO-2018143241 A1 | * | 8/2018 | ........... B23K 26/142 |

OTHER PUBLICATIONS

Feb. 7, 2020 Written Opinion of the International Searching Authority issued in International Patent Application No. PCT/CN2019/120388.

* cited by examiner

COMBINED PROCESSING HEAD CAPABLE OF EMITTING LASER AND LIQUID JET TO PRODUCE ABRASIVE FLOW AND WORKING METHOD THEREOF

BACKGROUND

Technical Field

The present invention relates to the technical field of laser processing devices, and specifically, to a combined processing head capable of emitting a laser and a liquid jet to produce an abrasive flow and a working method.

Related Art

Laser processing is non-contact processing, which requires no tool, features high processing speed and small surface deformation, and is suitable for processing various materials. It is found that most of existing laser processes is based on a single technique, that is, melting and vaporizing the material only by using high temperature of the laser, which inevitably leads to the formation a recast layer, undoubtedly lowering the precision of the laser processing. An existing laser processing head can only be used for laser processing, and cannot implement combined processing. As a result, the laser processing industry is still at a low level.

SUMMARY

The present invention aims to overcome disadvantages in the prior art, and provides a combined processing head capable of emitting a laser and a liquid jet to produce an abrasive flow, which can effectively remove a recast layer formed during laser processing, improve the precision of the laser processing, and reduce the surface roughness of a workpiece.

To achieve the above objective, the following technical solutions are used in the present invention:

A combined processing head capable of emitting a laser and a liquid jet to produce an abrasive flow includes:

a jetting mechanism including a connection portion, where the connection portion is provided with a passage in communication with a nozzle and inner space of a lens cylinder, one end of the connection portion is connected to the lens cylinder, the other end of the connection portion is connected to the nozzle and extends into the nozzle, the part of the connection portion extending into the nozzle is provided with a flange in close contact with a side wall of the nozzle, the part of the connection portion extending into the nozzle and the side wall of the nozzle form an annular cavity, the flange is provided with a plurality of through holes, the through holes are in communication with the annular cavity and inner space of the nozzle, a liquid injection port configured to inject a saturated salt solution at a set pressure into the annular cavity is provided at a position on the side wall of the nozzle at which position the annular cavity is located, and after the annular cavity is filled with the saturated salt solution, the saturated salt solution flows through the through holes and is ejected from the nozzle, preventing the solution from forming turbulence to affect irradiation and propagation of a laser beam; and a cooling mechanism including a cooling cylinder having openings at two ends, where the cooling cylinder is provided therein with a cooling tube configured to cool the saturated salt solution ejected from the nozzle and flowing through the cooling cylinder, so that fine grains are precipitated from the saturated salt solution.

By disposing the nozzle and the cooling mechanism, the laser processing can be performed while the saturated salt solution can be ejected. The fine grains are precipitated from the saturated salt solution by using the cooling mechanism to form an abrasive flow to impact and grind a workpiece surface, improving quality of the workpiece surface.

Further, one end of the lens cylinder is connected to the connection portion, the other end of the lens cylinder is connected to an end cover, the end cover is provided with an interface, and the interface is configured to connect to a laser transmission cable.

Further, a lens frame is mounted inside the lens cylinder, a collimating lens and a focusing lens are mounted on the lens frame, and the collimating lens is mounted close to the interface.

Further, the connection portion includes a first connecting section, a second connecting section, and an extension section, the first connecting section is threadedly connected to a lens cylinder, the second connecting section is threadedly connected to a nozzle, the extension section extends into the nozzle, an outer diameter of the extension section is less than an inner diameter of the side wall of the nozzle, and the extension section and the side wall of the nozzle form the annular cavity.

Further, a contact surface between the flange and the nozzle is conical to ensure a sealing effect of the flange and the nozzle.

Further, the flange is detachably connected to a hollow isolation pipe, and inner space of the hollow isolation pipe is in communication with the passage to isolate the laser beam from the liquid jet.

Further, the lens cylinder is fixedly connected to a first connecting plate, and the cooling mechanism is connected to the first connecting plate by a second connecting plate.

Further, the second connecting plate is provided with an adjustment slot, an adjustment bolt passes through the adjustment slot, and the second connecting plate is fixedly connected to the first connecting plate by the adjustment bolt.

Further, the cooling tube is a spiral structure fixed to an inner side surface of the cooling cylinder.

The present invention further discloses a working method of the combined processing head capable of emitting a laser and a liquid jet to produce an abrasive flow. A laser beam is emitted out through the lens cylinder and the nozzle to laser process a workpiece, and a saturated salt solution at a set pressure is caused to flow through the annular cavity and the through holes and then to be ejected from the nozzle, and the cooling mechanism cools the ejected solution jet so that fine grains are precipitated from the saturated salt solution to impact and grind the workpiece.

The Present Invention has the Following Beneficial Effects

1. The combined processing head of the present invention can be connected to a laser transmission cable, and can inject a saturated salt solution at a set pressure into the nozzle through the liquid injection port, and therefore can emit a laser beam and eject a solution jet at the same time. The combined processing head has a cooling mechanism that can cool the saturated salt solution ejected from the nozzle, so that fine grains are precipitated from the saturated salt solution. By using the fine grains to impact and grind the surface of the workpiece, the recast layer on the surface of the workpiece can be effectively removed, thereby reducing the surface roughness of the workpiece, and improving the processing quality of the workpiece.

2. For the combined processing head of the present invention, the injected saturated salt solution first fills up the annular cavity, flows out through the through holes, and then is evenly ejected from the nozzle, preventing the saturated salt solution from forming turbulence to affect irradiation and propagation of a laser beam.

3. The combined processing head of the present invention has the hollow isolation pipe to isolate the saturated salt solution from the laser beam, thereby further reducing the effect of the saturated salt solution on the propagation of the laser beam.

4. For the combined processing head of the present invention, the flange is in contact with the side wall of the nozzle through an inclined surface, so that when the nozzle and the connection portion are screwed, sealing of the flange and the side wall of the nozzle can be ensured, so that the saturated salt solution only flows out through the through holes.

5. The combined processing head of the present invention, by means of the adjustment slot and the adjustment bolt, allows for the adjustment of relative positions of the cooling mechanism and the jetting mechanism, so that the liquid jet can be cooled at different positions, and fine grains are precipitated from the jet liquid jet at different positions, thus forming an abrasive flow.

BRIEF DESCRIPTION OF THE DRAWINGS

The accompanying drawings constituting a part of this application are used for providing further understanding for this application. Exemplary embodiments of this application and descriptions thereof are used for explaining this application and do not constitute a limitation to this application.

1. Lens cylinder; 1-1. Fixing plate; 2. End cover; 3. Interface; 4. Lens frame; 5. Boss structure; 6. Collimating lens; 7. Focusing lens; 8. Connection portion; 8-1. First connecting section; 8-2. Second connecting section; 8-3. Extension section; 8-4. Flange; 8-5. Through hole; 9. Liquid injection port; 10. Nozzle; 11. Hollow isolation pipe; 12. Cooling cylinder; 13. Cooling tube; 14. First connecting plate; 15. Second connecting plate; and 15-1. Adjustment slot.

DETAILED DESCRIPTION

It is to be noted that the following detailed descriptions are all exemplary and are intended to provide a further understanding of this application. Unless otherwise specified, all technical and scientific terms used herein have the same meaning as commonly understood by those of ordinary skill in the art to which this application belongs.

It should be noted that terms used herein are only for describing specific implementations and are not intended to limit exemplary implementations according to this application. As used herein, the singular form is also intended to include the plural form unless the context clearly dictates otherwise. In addition, it should be further understood that, terms "comprise" and/or "include" used in this specification indicate that there are features, steps, operations, devices, components, and/or combinations thereof.

For convenience of description, the words "above", "below", "left", and "right" only indicate directions consistent with those of the accompanying drawings, are not intended to limit the structure, and are used only for ease and brevity of illustration and description, rather than indicating or implying that the mentioned device or element needs to have a particular orientation or needs to be constructed and operated in a particular orientation. Therefore, such terms should not be construed as a limitation on the present invention.

As introduced in the related art section, existing laser processing heads cannot implement combined processing, and lead to the formation of a recast layer on the workpiece surface during laser processing, which has high roughness. In view of the above problems, this application provides a combined processing head capable of emitting a laser and a liquid jet to produce an abrasive flow.

Figure 1:
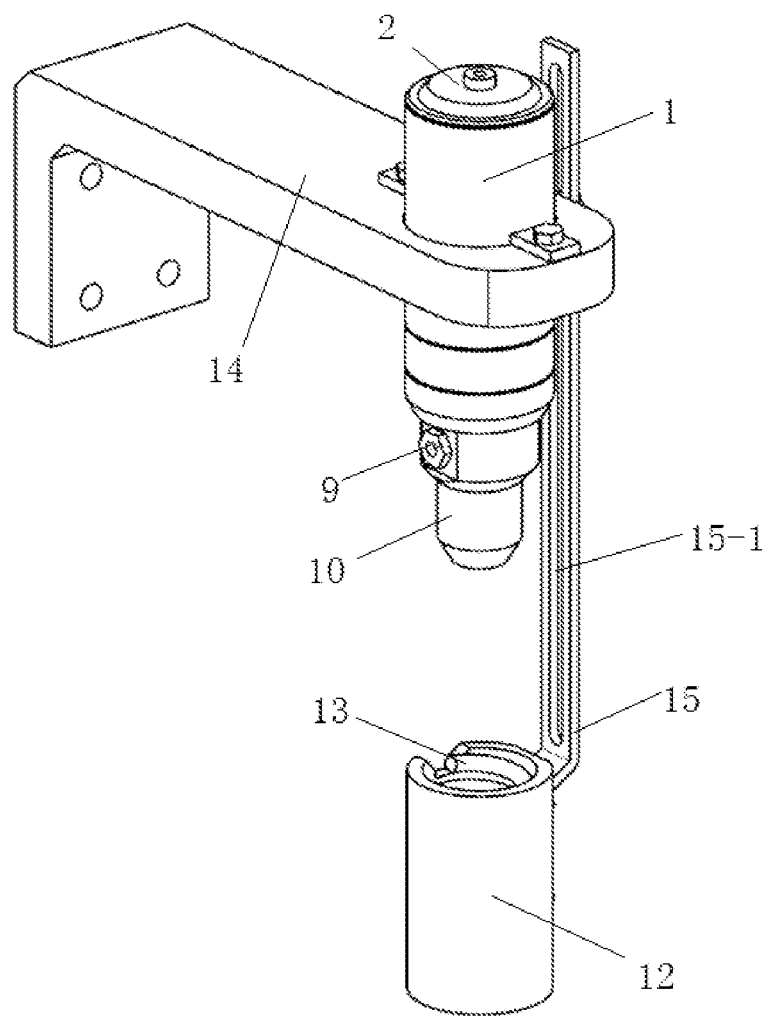
FIG. 1 is a schematic diagram of an overall structure according to Embodiment 1 of the present invention.
Figure 2:
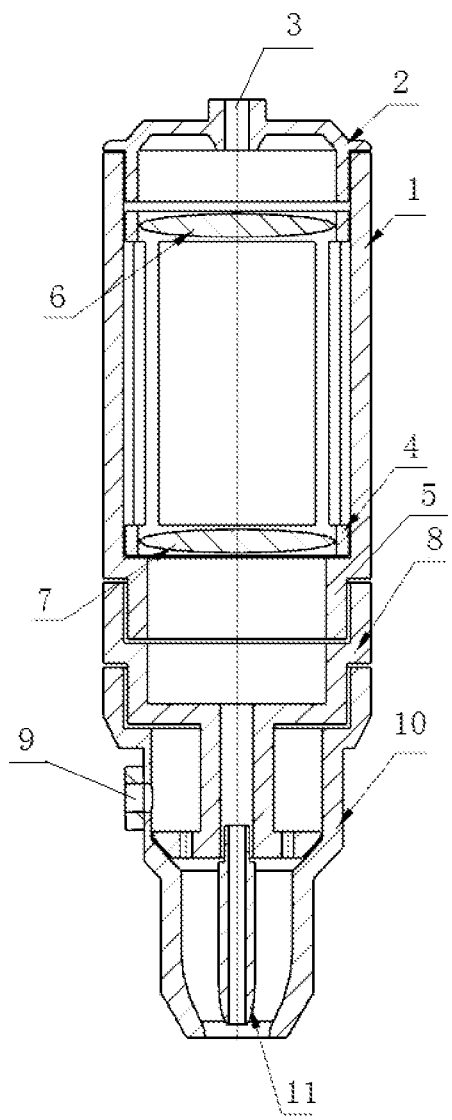
FIG. 2 is a schematic diagram of an internal structure of a jetting mechanism according to Embodiment 1 of the present invention.
Figure 3:
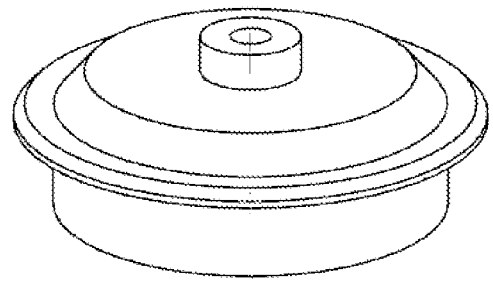
FIG. 3 is a schematic structural diagram of an end cover according to Embodiment 1 of the present invention.
Figure 4:
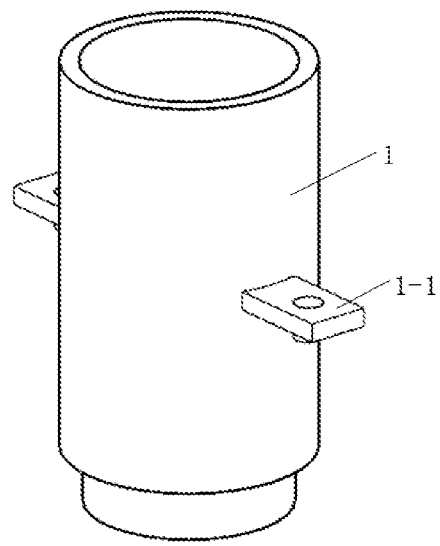
FIG. 4 is a schematic structural diagram of a lens cylinder according to Embodiment 1 of the present invention.
Figure 5:
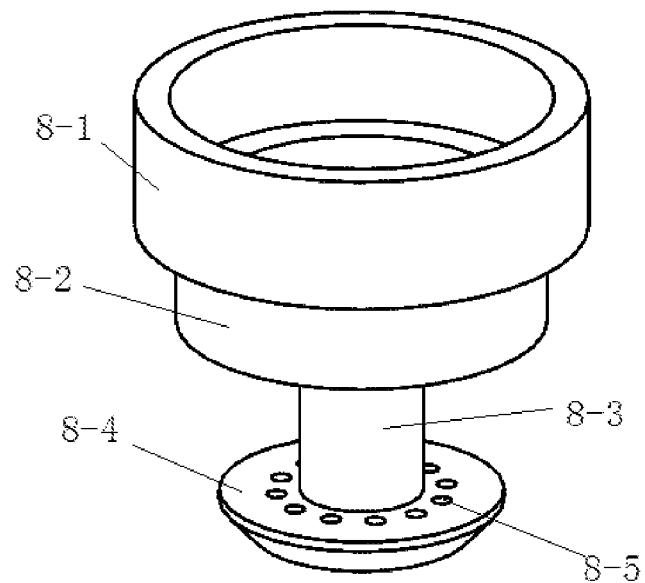
FIG. 5 is a schematic structural diagram of a connection portion according to Embodiment 1 of the present invention.
Figure 6:
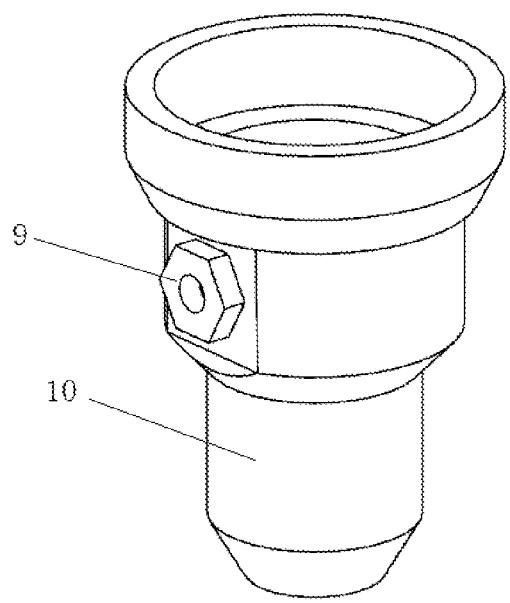
FIG. 6 is a schematic structural diagram of a nozzle according to Embodiment 1 of the present invention.
Figure 7:
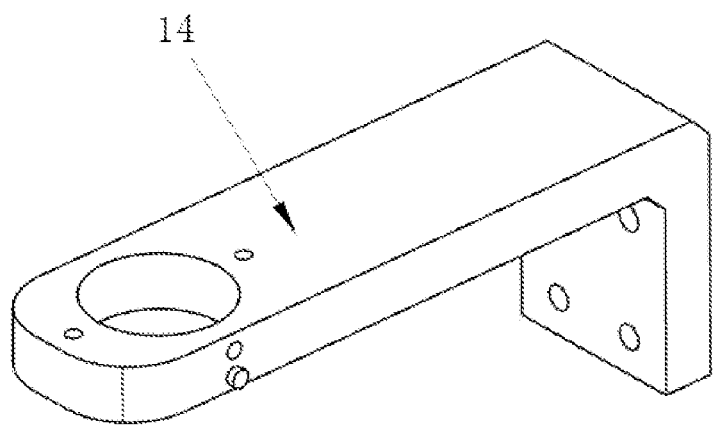
FIG. 7 is a schematic structural diagram of a first connecting plate according to Embodiment 1 of the present invention.
Figure 8:
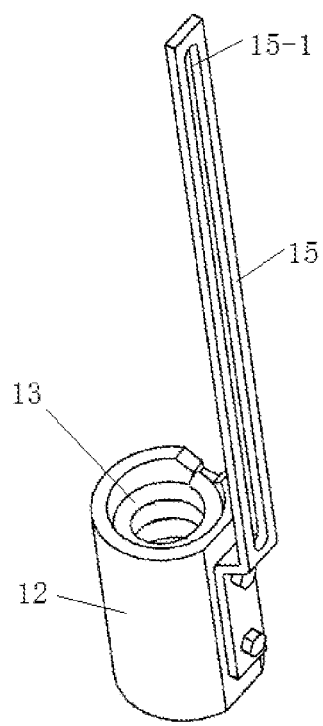
FIG. 8 is a schematic structural diagram of a cooling mechanism according to Embodiment 1 of the present invention.

In a typical Embodiment 1 of this application, as shown in FIG. 1 to FIG. 8, a combined processing head capable of emitting a laser and a liquid jet to produce an abrasive flow includes a jetting mechanism and a cooling mechanism. The jetting mechanism includes a lens cylinder, a connection portion, and a nozzle.

A top end of the lens cylinder 1 is threadedly connected to an end cover 2. A central part of the end cover is provided with an interface 3. The lens cylinder can be connected to a laser transmission cable through the interface. A laser beam transmitted from the laser transmission cable can enter the lens cylinder through the interface and then be emitted from the nozzle.

A lens frame 4 is connected to and located inside the lens cylinder. An outer wall of the lens frame is a hollow structure. A bottom end of the lens frame is placed on a boss structure 5 disposed on an inner surface of a bottom portion of the lens cylinder. A top end of the lens frame is fixedly connected to a collimating lens 6, and a bottom end of the lens frame is fixedly connected to a focusing lens 7.

The connection portion 8 includes a first connecting section 8-1, a second connecting section 8-2, and an extension section 8-3 integrally connected. The first connecting section has an internal thread structure, which is threadedly connected to the lens cylinder through an external thread structure of an end portion of the lens cylinder. An outer diameter of the second connecting section is less than an outer diameter of the first connecting section. The second connecting section is provided with an external thread structure, which is threadedly connected to the nozzle 10 through an internal thread structure disposed at an end portion of the nozzle. The extension section extends into the nozzle, and a bottom end of the extension section is provided with a flange 8-4 in close contact with an inner side surface of a side wall of the nozzle. An outer diameter of the extension section is less than an inner diameter of the nozzle at the corresponding position. The extension section and the side wall of the nozzle form an annular cavity. In this embodiment, the annular cavity may be circular, or may be in other shapes. A liquid injection port 9 is provided at a position on the side wall of the nozzle at which position the annular cavity is located. A saturated salt solution at a set pressure can be injected into the annular cavity through the liquid injection port. The saturated salt solution may be saturated sodium chloride solution, or may be other saturated salt solutions. The flange is provided with a plurality of through holes 8-5 evenly distributed circumferentially. The saturated salt solution in the annular cavity may flow out through the through holes and be ejected from a jet port at a bottom portion of the nozzle.

The flange is an inverted cone structure, and a contact surface between the flange and the inner side surface of the side wall of the nozzle is conical. In this way, when the connection portion and the nozzle are threadedly connected together, the oblique contact surface can ensure the sealing effect the greatest extent, so that the saturated salt solution can only flow out through the through holes.

Because the second connecting section and the inner wall of the nozzle form the annular cavity, the jet liquid jet transmitted from a single direction may first fill up the annular cavity, flow out through the through holes evenly distributed circumferentially on the flange, and be evenly ejected out through the nozzle, preventing the liquid jet from forming turbulence to affect irradiation and propagation of a laser beam.

A central part of the flange is threadedly connected to a hollow isolation pipe 11, and inner space of the hollow isolation pipe is in communication with a passage to isolate the solution jet from the laser beam, further reducing the effect of the solution jet on the propagation of the laser beam.

The cooling mechanism is disposed below the jetting mechanism. The cooling mechanism includes a cooling cylinder 12 having openings at two ends. A cooling tube 13 of a spiral structure is fixed to an inner surface of the cooling cylinder. The cooling cylinder can receive the saturated salt solution ejected from the jetting mechanism. A coolant may be fed into the cooling tube, with an upper end of the cooling tube being a coolant outlet and a lower end of the cooling tube being a coolant inlet. The cooling tube is configured to cool the saturated salt solution entering the cooling cylinder, so that fine grains are precipitated from the saturated salt solution to form an abrasive flow.

Fixing plates 1-1 symmetrically distributed are fixed to an outer side surface of a wall of the lens cylinder, and the fixing plate is provided with a threaded hole. The lens cylinder is fixedly connected to a first connecting plate 14 through the threaded hole on the fixing plate and a fixing bolt. The first connecting plate is an L-shaped structure and is configured to connect the lens cylinder, the nozzle, and the connection portion with other devices.

The cooling cylinder is connected to a second connecting plate 15 through bolts, the second connecting plate is provided with an adjustment slot 15-1, an adjustment bolt passes through the adjustment slot, and the second connecting plate is connected to the first connecting plate by the adjustment bolt. Through the adjustment slot and the adjustment bolt, adjustment of relative positions of the nozzle and the cooling mechanism can be implemented, and cooling of the jet liquid jet at different positions can further be implemented, so that the fine grains are precipitated from the jet liquid jet at different positions to form the abrasive flow.

Embodiment 2

This embodiment discloses a working method of the combined processing head capable of emitting a laser and a liquid jet to produce an abrasive flow. A saturated salt solution (saturated sodium chloride solution) at a set pressure is injected into the nozzle through the liquid injection port. The lens cylinder is connected to a laser transmission cable through the interface. A laser beam transmitted from the laser transmission cable enters the lens cylinder through the interface, enters the passage through the collimating lens and the focusing lens, and then is emitted out through the jet port at the bottom portion of the nozzle after passing through the inner cavity of the hollow isolation pipe, to laser process a workpiece. At the same time, the saturated salt solution at the set pressure is injected into the annular cavity through the liquid injection port. After filling up the annular cavity, the saturated salt solution flows out through the through holes. The saturated salt solution at the set pressure is ejected out through the nozzle. After the solution jet flows through the cooling cylinder, the cooling tube cools the solution jet, so that fine grains are precipitated from the saturated salt solution. The fine grains are ejected together with the saturated salt solution to grind and impact the surface of the workpiece to remove a recast layer on the workpiece formed during laser processing, thereby reducing surface roughness of the workpiece, and improving the processing quality of the workpiece.

The specific implementations of the present invention are described above with reference to the accompanying drawings, but are not intended to limit the protection scope of the present invention. Those skilled in the art should understand that various modifications or deformations may be made without creative efforts based on the technical solutions of the present invention, and such modifications or deformations shall fall within the protection scope of the present invention.

What is claimed is:

1. A combined processing head capable of emitting a laser and a liquid jet to produce an abrasive flow, comprising:
    a jetting mechanism comprising a connection portion, wherein the connection portion includes a passage in communication with a nozzle and inner space of a lens cylinder, one end of the connection portion is connected to the lens cylinder, the other end of the connection portion is connected to the nozzle and extends into the nozzle, the part of the connection portion extending into the nozzle includes a flange in close contact with a side wall of the nozzle, the part of the connection portion extending into the nozzle and the side wall of the nozzle form an annular cavity, the flange includes a plurality of through holes, the through holes are in communication with the annular cavity and inner space of the nozzle, a liquid injection port configured to inject a saturated salt solution at a set pressure into the annular cavity is at a position on the side wall of the nozzle at which the annular cavity is located, after the annular cavity is filled with the saturated salt solution, the saturated salt solution flows through the through holes and is ejected from the nozzle, preventing the solution from forming turbulence to affect irradiation and propagation of a laser beam, wherein
    the connection portion comprises a first connecting section, a second connecting section, and an extension section,
    the first connecting section is threadedly connected to the lens cylinder,
    the second connecting section is threadedly connected to the nozzle,
    the extension section extends into the nozzle, an outer diameter of the extension section is less than an inner diameter of the side wall of the nozzle, and the extension section and the side wall of the nozzle form the annular cavity; and a cooling mechanism comprising a cooling cylinder having openings at two ends, and a cooling tube in the cooling cylinder that is configured to cool the saturated salt solution ejected from the nozzle and flowing through the cooling cylinder, wherein the lens cylinder is fixedly connected to a first connecting plate, the cooling mechanism is connected to the first connecting plate by a second connecting plate, the second connecting plate includes an adjustment slot, an adjustment bolt passes through the adjustment slot, and the second connecting plate is fixedly connected to the first connecting plate by the adjustment bolt to allow cooling of the saturated salt solution at different positions so that fine grains are precipitated from the saturated salt solution.

2. The combined processing head according to claim 1, wherein one end of the lens cylinder is connected to the connection portion, the other end of the lens cylinder is connected to an end cover, the end cover is includes an interface, and the interface is configured to connect to a laser transmission cable.

3. The combined processing head according to claim 2, wherein a lens frame is mounted inside the lens cylinder, a collimating lens and a focusing lens are mounted on the lens frame, and the collimating lens is mounted close to the interface.

4. A working method of the combined processing head according to claim 3, wherein the laser beam is emitted out through the lens cylinder and the nozzle to laser process a workpiece, the saturated salt solution at a set pressure is caused to flow through the annular cavity and the through holes and then to be ejected from the nozzle, and the cooling mechanism cools the ejected solution jet so that fine grains precipitate from the saturated salt solution to impact and grind the workpiece.

5. A working method of the combined processing head according to claim 2, wherein the laser beam is emitted out through the lens cylinder and the nozzle to laser process a workpiece, the saturated salt solution at a set pressure is caused to flow through the annular cavity and the through holes and then to be ejected from the nozzle, and the cooling mechanism cools the ejected solution jet so that fine grains precipitate from the saturated salt solution to impact and grind the workpiece.

6. The combined processing head according to claim 1, wherein a contact surface between the flange and the nozzle is conical.

7. A working method of the combined processing head according to claim 6, wherein the laser beam is emitted out through the lens cylinder and the nozzle to laser process a workpiece, the saturated salt solution at a set pressure is caused to flow through the annular cavity and the through holes and then to be ejected from the nozzle, and the cooling mechanism cools the ejected solution jet so that fine grains precipitate from the saturated salt solution to impact and grind the workpiece.

8. The combined processing head according to claim 1, wherein the flange is detachably connected to a hollow isolation pipe, and inner space of the hollow isolation pipe is in communication with the passage.

9. A working method of the combined processing head according to claim 8, wherein the laser beam is emitted out through the lens cylinder and the nozzle to laser process a workpiece, the saturated salt solution at a set pressure is caused to flow through the annular cavity and the through holes and then to be ejected from the nozzle, and the cooling mechanism cools the ejected solution jet so that fine grains precipitate from the saturated salt solution to impact and grind the workpiece.

10. The combined processing head according to claim 1, wherein the cooling tube is a spiral structure fixed to an inner side surface of the cooling cylinder.

11. A working method of the combined processing head according to claim 10, wherein the laser beam is emitted out through the lens cylinder and the nozzle to laser process a workpiece, the saturated salt solution at a set pressure is caused to flow through the annular cavity and the through holes and then to be ejected from the nozzle, and the cooling mechanism cools the ejected solution jet so that fine grains precipitate from the saturated salt solution to impact and grind the workpiece.

12. A working method of the combined processing head according to claim 1, wherein the laser beam is emitted out through the lens cylinder and the nozzle to laser process a workpiece, the saturated salt solution at a set pressure is caused to flow through the annular cavity and the through holes and then to be ejected from the nozzle, and the cooling mechanism cools the ejected solution jet so that fine grains precipitate from the saturated salt solution to impact and grind the workpiece.

* * * * *